(12) United States Patent
Michael

(10) Patent No.: US 6,171,452 B1
(45) Date of Patent: Jan. 9, 2001

(54) ELECTRODELESS DISCHARGE SYSTEM FOR CONTROLLED GENERATION OF OZONE

(75) Inventor: Joseph Darryl Michael, Schoharie, NY (US)

(73) Assignee: General Electric Company, Schenectady, NY (US)

(*) Notice: Under 35 U.S.C. 154(b), the term of this patent shall be extended for 0 days.

This patent is subject to a terminal disclaimer.

(21) Appl. No.: 09/339,664

(22) Filed: Jun. 24, 1999

(51) Int. Cl.[7] .............................. C01B 13/10; B01J 19/12
(52) U.S. Cl. ................ 204/176; 204/157.5; 422/186.07; 422/186.03
(58) Field of Search ............... 204/157.5, 176; 422/186.03, 186.07, 186.3

(56) References Cited

U.S. PATENT DOCUMENTS

| | | | |
|---|---|---|---|
| 4,156,652 | * 5/1979 | Wiest | 422/186.07 |
| 4,273,660 | * 6/1981 | Beitzel | 210/760 |
| 4,535,247 | * 8/1985 | Kurtz | 250/436 |
| 4,694,179 | * 9/1987 | Lew et al. | 250/431 |
| 5,326,539 | * 7/1994 | Taylor | 422/186.07 |
| 5,382,878 | * 1/1995 | Secen et al. | 315/248 |
| 5,760,547 | * 6/1998 | Borowiec | 315/248 |
| 5,959,405 | * 9/1999 | Soules et al. | 313/635 |

* cited by examiner

Primary Examiner—Kathryn Gorgos
Assistant Examiner—Thao Tran
(74) Attorney, Agent, or Firm—Jill M. Breedlove; Douglas E. Stoner

(57) ABSTRACT

Controlled generation of ozone is provided by flowing air around an electrodeless low pressure discharge lamp having high ultraviolet transmission properties. Power to the lamp is controlled by a circuit that is driven by a photocell for detecting visible light emissions from a phosphor triggered by ultraviolet radiation from the lamp upon the phosphor.

10 Claims, 3 Drawing Sheets

ELECTRODELESS DISCHARGE SYSTEM FOR CONTROLLED GENERATION OF OZONE

BACKGROUND OF THE INVENTION

The present invention generally relates to systems for generating ozone, and in particular to controlled use of ultraviolet radiation for generating ozone.

Ultraviolet radiation has long been known to be an effective generator of ozone. Prior art ozone generation systems rely solely on the use of electroded linear low pressure discharge lamps that use mercury. These linear systems are very similar to standard fluorescent lamps in terms of operation, except that there are no phosphor coatings and the glass used (a hard glass, not quartz) usually transmits a substantial amount of the 254 nm radiation emitted from the mercury atom. These electroded systems have two typical modes of failure: 1) electrode failure and 2) solarization of the glass due to the UV flux.

It would be a desirable advance upon the prior art to have a UV ozone generation device having a longer-lived lamp and ballast. It is furthermore desirable that such a device be made out of high quality quartz which does not degrade as rapidly as treated hard glass. It is also desirable to provide such a device with a compact design which operates at higher power and provides higher UV output.

BRIEF SUMMARY OF THE INVENTION

A low-pressure electrodeless lamp having high ultraviolet transmission properties is used for controlled generation of ozone. The lamp envelope is preferably comprised of a glass/quartz composite. The ultraviolet output (primarily 254 nm radiation) is directed from the low pressure (e.g., mercury) discharge into a cylindrical enclosure around the lamp, through which air is channeled. The cylindrical enclosure is constructed with a fan at one end that forces air from outside the enclosure over the lamp body such that air mixed with ozone flows out the other end of the cylinder.

DETAILED DESCRIPTION OF THE INVENTION

Figure 1:
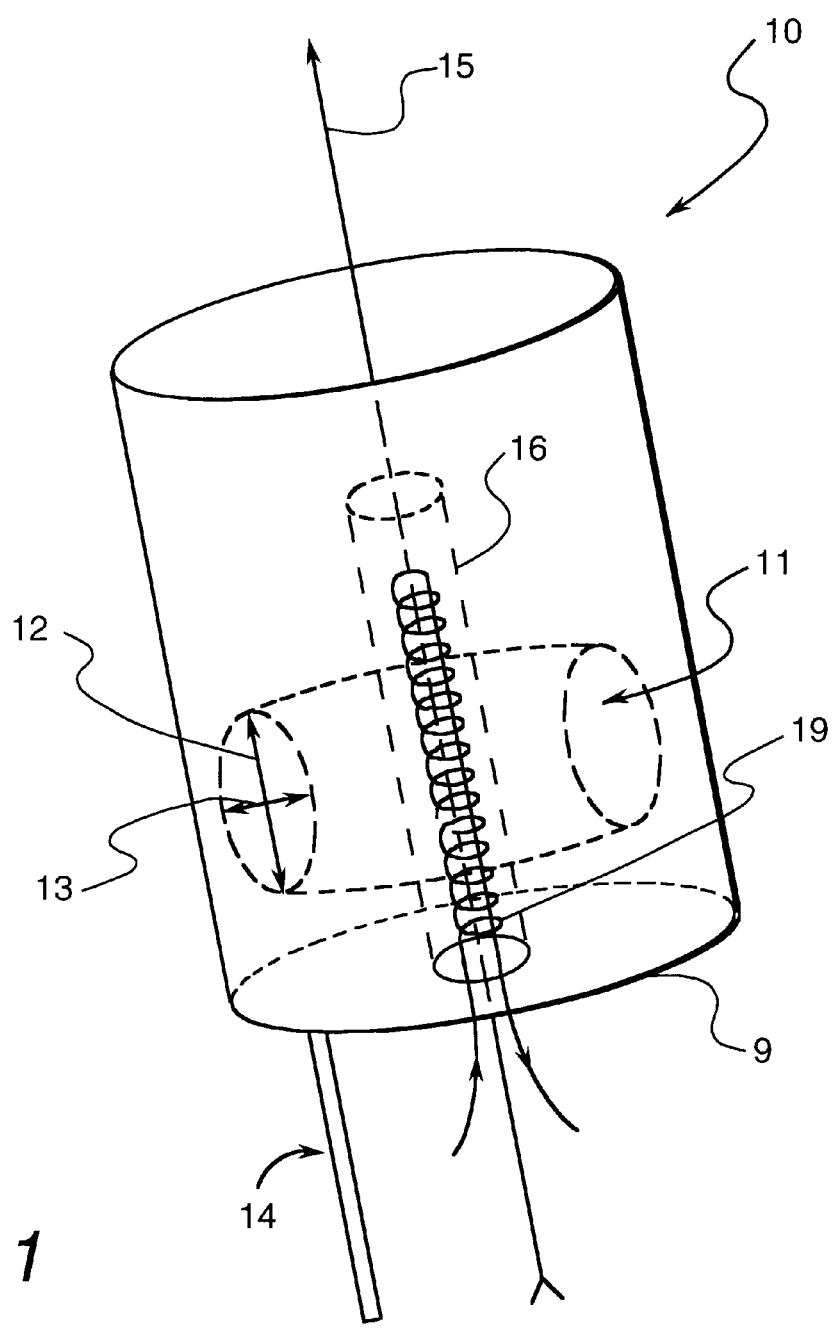
FIG. 1 is a perspective drawing of one embodiment of a lamp used to generate ultraviolet radiation in accordance with the invention.

FIG. 1 illustrates an embodiment of an electrodeless fluorescent lamp 10 according to the present invention. Such an electrodeless fluorescent lamp may be manufactured using technology of a type employed to manufacture lamps such as those sold under the trademark GENURA of General Electric Company. Lamp 10 has an envelope 9 containing an ionizable, gaseous full. Envelope 9 is preferably made of quartz.

A suitable fill for the electrodeless fluorescent lamp of FIG. 1 comprises a mixture of a rare gas (e.g., krypton and/or argon) and mercury vapor and/or cadmium vapor. A re-entrant cavity 16 within the envelope 9 has an excitation coil 19 associated therewith, e.g., contained within the re-entrant cavity. Envelope 9 fits into one end of a lamp base assembly (not shown), such as an Edison type base, for example, for coupling to a radio frequency power supply.

In operation, current flows in excitation coil 19 as a result of excitation by the radio frequency power supply. As a result, a radio frequency magnetic field is established within envelope 9, in turn creating an electric field which ionizes and excites the gaseous fill contained therein, resulting in a UV discharge 11. A useful UV discharge is in the range up to about 400 nm, particularly at 254 nm. For the illustrated embodiment, the discharge body 11 is toroidal in shape.

By way of illustration, an exemplary compact design of electrodeless fluorescent lamp 10 of FIG. 1 has a 20 W discharge, and the cross section of the toroidal discharge can be represented by an ellipse with a major axis 12 of about 23 mm and a minor axis 13 of approximately 13 mm. For this example, the major radius (measured from the center of the discharge 11 to the axis 15 running through the center of re-entrant cavity 16) of the discharge is at 18.75 mm. An exemplary outside diameter (OD) may be as large as 80 mm. A larger OD enables operation of the device without saturating UV output, but may increase the difficulty of manufacturing the lamp body. There is also shown in FIG. 1 an exhaust tube 14 used for filling the lamp during the manufacture thereof. In alternative embodiments, the exhaust tube may be situated at other positions in the lamp without effecting operation of the lamp as described herein.

For the example set forth hereinabove, simulations indicate that the main portion of the UV flux exits the lamp 10 from the discharge body 11 within a width (in the direction of the major axis 12) of 23 mm centered on the discharge body 11. For a lamp having an OD of 50 mm, for example, the total circumferential surface area is $\pi \times 50$ mm$\times$23 mm=36 cm$^2$; and for a discharge of 20 W, simulations show that the amount of 254 nm radiation directly impinging on this region is about 6 W. This means that the UV flux, $\Gamma$, through this band is $\Gamma$=6 W/36 cm$^2$=0.17 W/cm$^2$.

Figure 2:
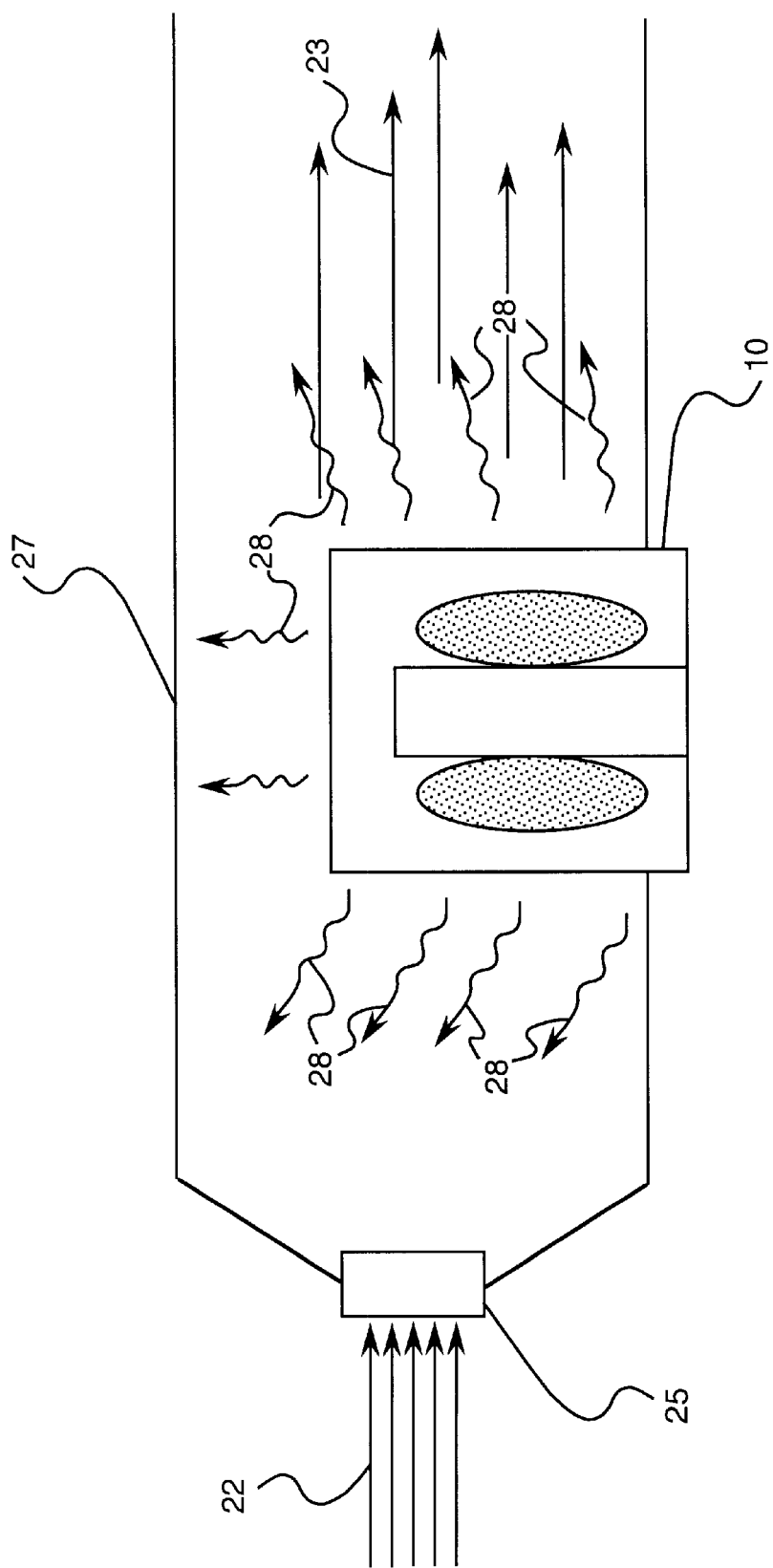
FIG. 2 is an overhead view of the lamp of FIG. 1 showing the flow of air around the lamp.

The lamp system is configured to have the air flow 22 over the circumference of the lamp 10, as shown in FIG. 2, by using a fan 25 connected to a cylindrical container 27 that houses the lamp 10. UV radiation 28 (e.g., primarily at a wavelength of 254 nanometers) from the lamp 10 penetrates into container 27, producing Ozone ($O_3$) through a chemical reaction between the UV photons 28 and the oxygen in the air 22.

Output 23 of ozone (mixed with air) is a function of the dimensional constraints of the particular application. Since the technology is scalable, it is feasible to construct larger lamps which support proportionally larger devices. To achieve compact design with high power, a lamp with an OD in the range of 70 mm to 90 mm may be used, for example; and for that range the corresponding major and minor axes of the discharge toroid would be in the range of 20 mm to 25 mm and in the range of 10 mm to 15 mm, respectively.

Figure 3:
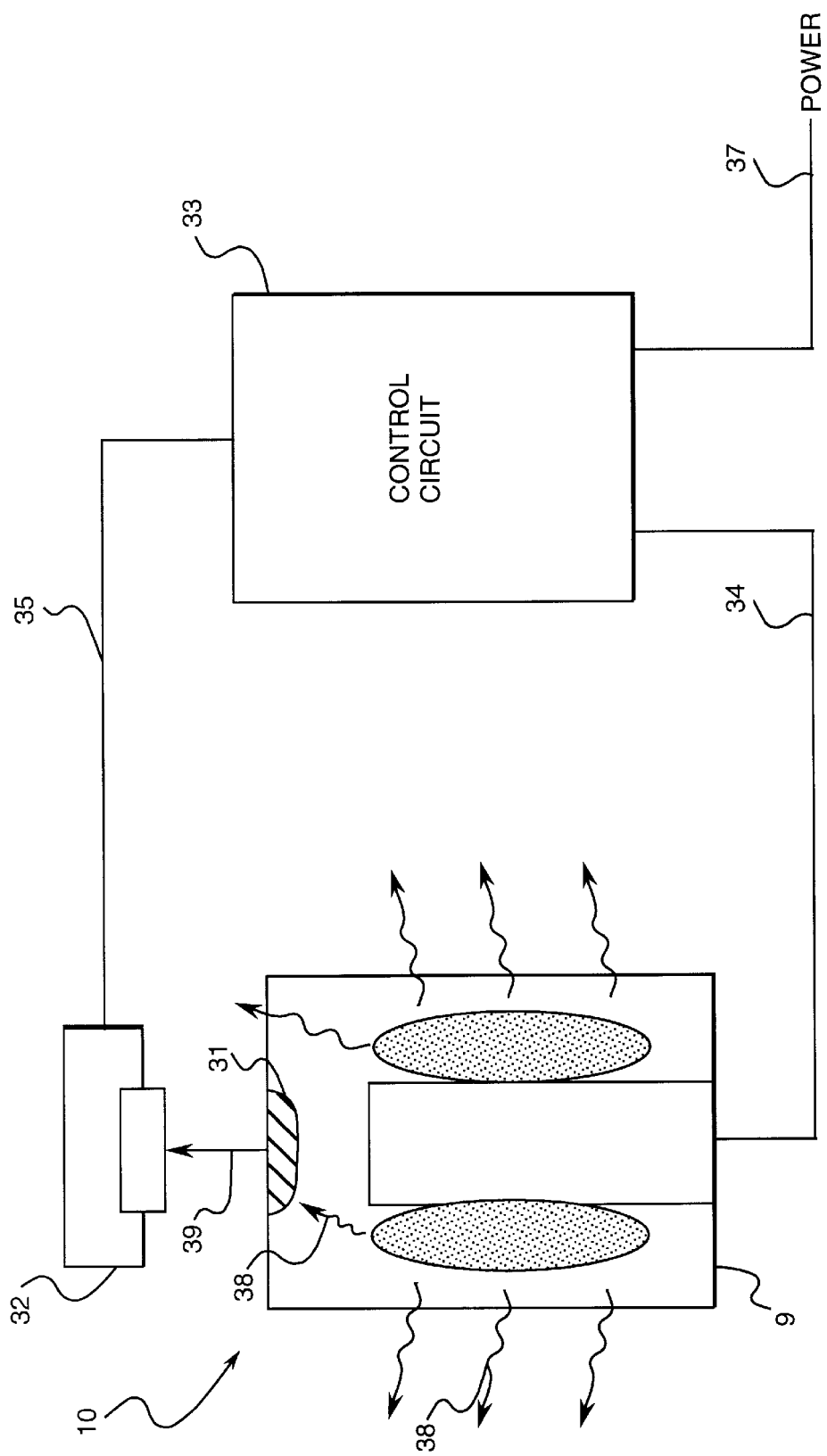
FIG. 3 is a drawing showing a phosphor coating on a portion of the lamp, together with a photocell for detecting visible light and a circuit for controlling power to the lamp.

FIG. 3 shows a phosphor 31 applied to a part of the lamp 10 which is exposed to low amounts of UV radiation 38. The phosphor generates visible light when exposed to UV. This visible light 39 is detected by photocell 32, whose output 35 will be directly proportional to the UV radiation 38 applied to the phosphor 31. Alternatively, a photocell 32 may be used for directly detecting UV radiation 38. A photocell output signal 35 is used in a control circuit 33 to provide a signal 37 to turn off the power connected to the lamp 10, for example, when the visible light 39 emitted by the phosphor 31 drops below a certain threshold value. Control circuitry used in this fashion would also avoid destruction of the lamp should ignition fail to occur during startup.

Lamps constructed according to preferred embodiments of the present invention have quartz envelopes (rather than glass which is usually used for lamps having electrodes), such as, for example, quartz known commercially as GE 214 quartz of General Electric Company, thereby enabling operation at higher power without damaging the envelopes.

While preferred embodiments of the invention have been described herein, those skilled in the art will recognize that such embodiments have been provided by way of example only. Numerous variations, changes and substitutions will occur to those of skill in the are without departing from the invention herein. Accordingly, it is intended that the invention be limited only by the spirit and scope of the appended claims.

What is claimed is:

1. An apparatus for controlled generation of ozone, comprising:

a low pressure electrodeless discharge lamp having an envelope containing an ionizable, gaseous fill for sustaining an arc discharge when subjected to an alternating frequency magnetic field and for emitting ultraviolet (UV) radiation as a result thereof, the lamp having an excitation coil situated within the envelope for providing the alternating frequency magnetic field when excited by an alternating current power supply such that the arc discharge has a toroidal shape;

a housing for directing a flow of air around the lamp through UV radiation emitted by the discharge, thereby generating ozone; and circuitry responsive to the UV radiation for controlling power to the lamp.

2. The apparatus of claim 1 wherein the lamp has an outside diameter of between 70 mm and 90 mm, a major axis of the toroidal discharge being between 20 mm and 25 mm and a minor axis of the toroidal discharge being between 10 mm and 15 mm.

3. The apparatus of claim 1 wherein the control circuitry comprises a photocell positioned to detect visible light emitted by a phosphor applied to the lamp, the visible light emissions being triggered by the UV radiation striking the phosphor.

4. The apparatus of claim 1 wherein the control circuitry comprises a photocell for directly detecting the UV radiation.

5. A method for generating ozone, comprising the steps of:

providing an electrodeless source of ultraviolet (UV) radiation comprising a low pressure discharge lamp having high ultraviolet transmission properties and producing an arc discharge, the lamp comprising an excitation coil situated within an envelope containing an ionizable, gaseous fill for providing an alternating frequency magnetic field when excited by an alternating current power supply such that the arc discharge is disposed in a toroidal configuration about an axis of the lamp;

directing a flow of air through the UV radiation such that the ozone is produced through a chemical reaction between the air and UV radiation; and controlling the generation of ozone depending on an output measure of the UV radiation.

6. The method of claim 5 wherein the output measure is provided by a photocell for detecting the UV radiation.

7. The method of claim 5 wherein the directing step further comprises providing a housing for directing the air flow, the housing having an opening for allowing air into the housing and an exit for expelling an air/ozone mixture from the housing; and forcing air into said housing through the opening.

8. An apparatus for controlled generation of ozone, comprising:

a low pressure electrodeless mercury discharge lamp having an envelope containing an ionizable, gaseous fill for sustaining an arc discharge when subjected to an alternating frequency magnetic field and for emitting ultraviolet radiation as a result thereof, the lamp having an excitation coil situated within the envelope for providing the alternating frequency magnetic field when excited by an alternating current power supply such that the discharge has a toroidal shape;

a housing for directing a flow of air around the lamp through UV radiation emitted by the lamp, thereby generating ozone; and circuitry responsive to the UV radiation for controlling power to the lamp.

9. The apparatus of claim 8 wherein said control circuitry comprises a photocell for detecting visible light emitted by a phosphor, applied to the lamp, the visible light emissions being triggered by the UV radiation striking the phosphor.

10. The apparatus of claim 8, wherein the control circuitry further comprises a photocell for detecting the UV radiation.

\* \* \* \* \*